US011216441B1

(12) United States Patent
Chen et al.

(10) Patent No.: US 11,216,441 B1
(45) Date of Patent: Jan. 4, 2022

(54) SYSTEMS AND METHODS FOR MANAGING A HIGHLY AVAILABLE AND SCALABLE DISTRIBUTED DATABASE IN A CLOUD COMPUTING ENVIRONMENT

(71) Applicant: Coupang Corp., Seoul (KR)

(72) Inventors: Zhan Chen, Seattle, WA (US); Zhiyong Huang, Beijing (CN); Bin Dong, Beijing (CN); Chuanchuan Han, Beijing (CN); Junzhao Zhang, Beijing (CN)

(73) Assignee: Coupang Corp., Seoul (KR)

( * ) Notice: Subject to any disclaimer, the term of this patent is extended or adjusted under 35 U.S.C. 154(b) by 0 days.

(21) Appl. No.: 17/105,127

(22) Filed: Nov. 25, 2020

(51) Int. Cl.
*G06F 16/23* (2019.01)
*G06F 11/14* (2006.01)
*G06F 11/20* (2006.01)
*G06F 16/25* (2019.01)
*G06F 11/00* (2006.01)
(Continued)

(52) U.S. Cl.
CPC ........ *G06F 16/2358* (2019.01); *G06F 11/008* (2013.01); *G06F 11/1425* (2013.01); *G06F 11/2025* (2013.01); *G06F 11/3409* (2013.01); *G06F 16/21* (2019.01); *G06F 16/256* (2019.01)

(58) Field of Classification Search
CPC .............................. G06F 16/2358; G06F 16/21
See application file for complete search history.

(56) References Cited

U.S. PATENT DOCUMENTS

| | | | |
|---|---|---|---|
| 6,633,910 B1 * | 10/2003 | Rajan | G06Q 30/02 |
| | | | 709/224 |
| 8,938,422 B1 * | 1/2015 | Liu | G06F 16/9562 |
| | | | 707/628 |

(Continued)

FOREIGN PATENT DOCUMENTS

| | | |
|---|---|---|
| CN | 111124301 A | 5/2020 |
| JP | 2020-527264 A | 9/2020 |

OTHER PUBLICATIONS

Notice of Preliminary Rejection dated Sep. 30, 2021 in counterpart Korean Patent Application No. 10-2021-7018713 (18 pages).

(Continued)

*Primary Examiner* — Eliyah S. Harper
(74) *Attorney, Agent, or Firm* — Finnegan, Henderson, Farabow, Garrett & Dunner, LLP

(57) ABSTRACT

Systems and methods for managing a highly available distributed database comprising: a memory storing instructions; and one or more processors configured to execute the instructions to: determine that a source node, in a distributed database comprising the source node and one or more replica nodes, is not available; select a most-updated replica node from the one or more replica nodes; switch a role of the most-updated replica node to source; update a data store to label the source node as unavailable and the selected replica node as being a promoted source node; send a notification to a user device to update a database topology based on the updated data store; determine whether the user device has updated the database topology; and upon determining the user device has not updated the database topology, continue to send the notification to the user device until the user device has updated the database topology.

20 Claims, 11 Drawing Sheets

(51) Int. Cl.
*G06F 16/21* (2019.01)
*G06F 11/34* (2006.01)

(56) References Cited

U.S. PATENT DOCUMENTS

| | | | |
|---|---|---|---|
| 10,331,695 | B1 | 6/2019 | Stickle |
| 2004/0078464 | A1* | 4/2004 | Rajan ................... G06Q 30/02 709/224 |
| 2004/0111390 | A1* | 6/2004 | Saito .................... G06F 16/184 |
| 2007/0239790 | A1 | 10/2007 | Cattell et al. |
| 2008/0033964 | A1* | 2/2008 | Richards ............ G06F 11/2046 |
| 2013/0297565 | A1 | 11/2013 | Starkey |
| 2014/0143039 | A1 | 5/2014 | Branton |
| 2016/0371319 | A1* | 12/2016 | Park .................... G06F 16/951 |
| 2017/0026263 | A1* | 1/2017 | Gell .................... G06F 16/1844 |
| 2019/0102418 | A1 | 4/2019 | Vasudevan et al. |
| 2019/0132350 | A1* | 5/2019 | Smith ................. G06F 16/2379 |
| 2019/0347008 | A1* | 11/2019 | Fernandez Fernandez ................. G06F 3/0604 |
| 2020/0042619 | A1* | 2/2020 | Venkataramani ... H04L 67/1095 |
| 2021/0019766 | A1* | 1/2021 | Shakedd ............ G06K 19/0672 |

OTHER PUBLICATIONS

International Search Report and Written Opinion of the International Search Authority in International Application No. PCT/IB2020/061460 dated Aug. 18, 2021 (8 pages).

* cited by examiner

SYSTEMS AND METHODS FOR MANAGING A HIGHLY AVAILABLE AND SCALABLE DISTRIBUTED DATABASE IN A CLOUD COMPUTING ENVIRONMENT

TECHNICAL FIELD

The present disclosure generally relates to computerized methods and systems for building and maintaining a highly available and scalable distributed database in a cloud computing environment. In particular, embodiments of the present disclosure relate to inventive and unconventional systems that maximize uptime, minimize error from prolonged usage, and minimize failover time of databases by utilizing a data store to monitor the source of truth and notify the user device of any changes.

BACKGROUND

Certain systems require databases which are always available. The availability of a database is measured by the percentage of healthy time in its lifetime. Generally, highly available databases are those that are available 99.999% of the time or more. That is, they are down for fewer than 5.26 minutes per year. One method for achieving high availability in a database is to create a distributed database. This is a database where data are stored in multiple nodes in different locations. A plurality of database nodes is called a cluster. In most cases, a cluster consists of one source which serves write requests, and one or more replicas to serve read requests.

The idea behind distributed databases is that, should one node fail, there are others with the same data ready to take its place. Therefore, the database as a whole does not have to remain unavailable until the failed node comes back online. When a node fails, a distributed database will usually select another node to take its place and the period during which this occurs is called failover. Different systems have different failover times, but most still take minutes, which could be disastrous for certain businesses. Further, there is currently no standalone solution which can manage the distributed database and reduce failover time in a cost-effective way. Indeed, current solutions solve problems with availability by adding nodes to the distributed database, which is highly inefficient and costly.

Therefore, there is a need for systems and methods for managing a highly available and scalable distributed database in a cloud computing environment which reduce failover time to seconds and provide a standalone solution, with minimal redundancy for cost-efficiency. Such systems and methods would minimize failover time, lower the failure rate, and achieve greater uptime as a whole, providing businesses with a cost-effective solution which minimizes interruptions due to failures.

SUMMARY

One aspect of the present disclosure is directed to a computer-implemented system for managing a highly available distributed database in a cloud computing environment. The system may comprise a memory storing instructions; and one or more processors configured to execute the instructions to: determine that a source node, in a distributed database comprising the source node and one or more replica nodes, is not available; select a most-updated replica node from the one or more replica nodes; switch a role of the most-updated replica node from replica to source; update a data store to label the source node as unavailable and the selected replica node as being a promoted source node; send a notification to a user device connected to the distributed database to update a database topology log based on the updated data store; determine whether the user device has updated the database topology log; and upon determining the user device has not updated the database topology log, continue to send the notification to the user device until the user device has updated the database topology log.

Yet another aspect of the present disclosure is directed to a computer-implemented method for managing a highly available distributed database in a cloud computing environment. The method may comprise: determining that a source node, in a distributed database comprising the source node and one or more replica nodes, is not available; selecting a most-updated replica node from the one or more replica nodes; switching a role of the most-updated replica node from replica to source; updating a data store to label the source node as unavailable and the selected replica node as being a promoted source node; sending a notification to a user device connected to the distributed database to update a database topology log based on the updated data store; determining whether the user device has updated the database topology log; and upon determining the user device has not updated the database topology log, continuing to send the notification to the user device until the user device has updated the database topology log.

Still further, another aspect of the present disclosure is directed to a computer-implemented system for managing a highly available distributed database in a cloud computing environment. The system may comprise: a memory storing instructions; and one or more processors configured to execute the instructions to: determine that a source node, in a distributed database existing in a cloud computing environment comprising the source node and one or more replica nodes, is not available; select a most-updated replica node from the one or more replica nodes; switch a role of the most-updated replica node from replica to source; update a data store to label the source node as unavailable and the selected replica node as being a promoted source node; send a notification to a user device connected to the distributed database to update a database topology log based on the updated data store; determine whether the user device has updated the database topology log by checking the data store from a confirmation from the user device; upon determining the user device has not updated the database topology log, continue to send the notification to the user device until the user device has updated the database topology; and upon determining the user device has updated the database topology log, terminating the previous connection with the user device.

Other systems, methods, and computer-readable media are also discussed herein.

DETAILED DESCRIPTION

Figure 1A:
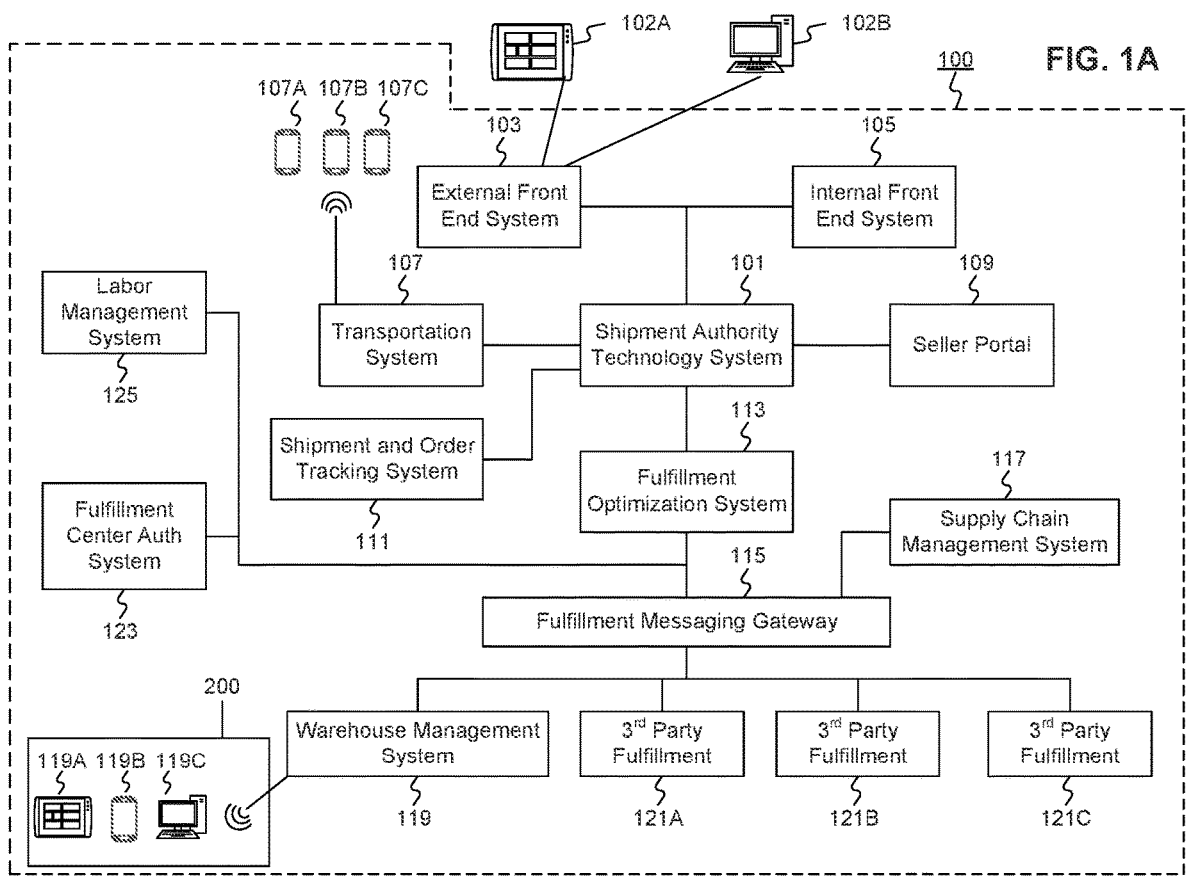
FIG. 1A is a schematic block diagram illustrating an exemplary embodiment of a network comprising computerized systems for communications enabling shipping, transportation, and logistics operations, consistent with the disclosed embodiments.
Figure 1B:
FIG. 1B depicts a sample Search Result Page (SRP) that includes one or more search results satisfying a search request along with interactive user interface elements, consistent with the disclosed embodiments.
Figure 1C:
FIG. 1C depicts a sample Single Display Page (SDP) that includes a product and information about the product along with interactive user interface elements, consistent with the disclosed embodiments.

The following detailed description refers to the accompanying drawings. Wherever possible, the same reference numbers are used in the drawings and the following description to refer to the same or similar parts. While several illustrative embodiments are described herein, modifications, adaptations and other implementations are possible. For example, substitutions, additions, or modifications may be made to the components and steps illustrated in the drawings, and the illustrative methods described herein may be modified by substituting, reordering, removing, or adding steps to the disclosed methods. Accordingly, the following detailed description is not limited to the disclosed embodiments and examples. Instead, the proper scope of the invention is defined by the appended claims.

Embodiments of the present disclosure are directed to computerized methods and systems that manage a highly available and scalable distributed database, where constant uptime and minimal error rate are desired.

Referring to FIG. 1A, a schematic block diagram 100 illustrating an exemplary embodiment of a system comprising computerized systems for communications enabling shipping, transportation, and logistics operations is shown. As illustrated in FIG. 1A, system 100 may include a variety of systems, each of which may be connected to one another via one or more networks. The systems may also be connected to one another via a direct connection, for example, using a cable. The depicted systems include a shipment authority technology (SAT) system 101, an external front end system 103, an internal front end system 105, a transportation system 107, mobile devices 107A, 107B, and 107C, seller portal 109, shipment and order tracking (SOT) system 111, fulfillment optimization (FO) system 113, fulfillment messaging gateway (FMG) 115, supply chain management (SCM) system 117, warehouse management system 119, mobile devices 119A, 119B, and 119C (depicted as being inside of fulfillment center (FC) 200), 3rd party fulfillment systems 121A, 121B, and 121C, fulfillment center authorization system (FC Auth) 123, and labor management system (LMS) 125.

SAT system 101, in some embodiments, may be implemented as a computer system that monitors order status and delivery status. For example, SAT system 101 may determine whether an order is past its Promised Delivery Date (PDD) and may take appropriate action, including initiating a new order, reshipping the items in the non-delivered order, canceling the non-delivered order, initiating contact with the ordering customer, or the like. SAT system 101 may also monitor other data, including output (such as a number of packages shipped during a particular time period) and input (such as the number of empty cardboard boxes received for use in shipping). SAT system 101 may also act as a gateway between different devices in system 100, enabling communication (e.g., using store-and-forward or other techniques) between devices such as external front end system 103 and FO system 113.

External front end system 103, in some embodiments, may be implemented as a computer system that enables external users to interact with one or more systems in system 100. For example, in embodiments where system 100 enables the presentation of systems to enable users to place an order for an item, external front end system 103 may be implemented as a web server that receives search requests, presents item pages, and solicits payment information. For example, external front end system 103 may be implemented as a computer or computers running software such as the Apache HTTP Server, Microsoft Internet Information Services (IIS), NGINX, or the like. In other embodiments, external front end system 103 may run custom web server software designed to receive and process requests from external devices (e.g., mobile device 102A or computer 102B), acquire information from databases and other data stores based on those requests, and provide responses to the received requests based on acquired information.

In some embodiments, external front end system 103 may include one or more of a web caching system, a database, a search system, or a payment system. In one aspect, external front end system 103 may comprise one or more of these systems, while in another aspect, external front end system 103 may comprise interfaces (e.g., server-to-server, database-to-database, or other network connections) connected to one or more of these systems.

An illustrative set of steps, illustrated by FIGS. 1B, 1C, 1D, and 1E, will help to describe some operations of external front end system 103. External front end system 103 may receive information from systems or devices in system 100 for presentation and/or display. For example, external front end system 103 may host or provide one or more web pages, including a Search Result Page (SRP) (e.g., FIG. 1B), a Single Detail Page (SDP) (e.g., FIG. 1C), a Cart page (e.g., FIG. 1D), or an Order page (e.g., FIG. 1E). A user device (e.g., using mobile device 102A or computer 102B) may navigate to external front end system 103 and request a search by entering information into a search box. External front end system 103 may request information from one or more systems in system 100. For example, external front end system 103 may request information from FO System 113 that satisfies the search request. External front end system 103 may also request and receive (from FO System 113) a Promised Delivery Date or "PDD" for each product included in the search results. The PDD, in some embodiments, may represent an estimate of when a package containing the product will arrive at the user's desired location or a date by which the product is promised to be delivered at the user's desired location if ordered within a particular period of time, for example, by the end of the day (11:59 PM). (PDD is discussed further below with respect to FO System 113.)

External front end system 103 may prepare an SRP (e.g., FIG. 1B) based on the information. The SRP may include information that satisfies the search request. For example, this may include pictures of products that satisfy the search request. The SRP may also include respective prices for each product, or information relating to enhanced delivery options for each product, PDD, weight, size, offers, discounts, or the like. External front end system 103 may send the SRP to the requesting user device (e.g., via a network).

A user device may then select a product from the SRP, e.g., by clicking or tapping a user interface, or using another input device, to select a product represented on the SRP. The user device may formulate a request for information on the selected product and send it to external front end system 103. In response, external front end system 103 may request information related to the selected product. For example, the information may include additional information beyond that presented for a product on the respective SRP. This could include, for example, shelf life, country of origin, weight, size, number of items in package, handling instructions, or other information about the product. The information could also include recommendations for similar products (based on, for example, big data and/or machine learning analysis of customers who bought this product and at least one other product), answers to frequently asked questions, reviews from customers, manufacturer information, pictures, or the like.

External front end system 103 may prepare an SDP (Single Detail Page) (e.g., FIG. 1C) based on the received product information. The SDP may also include other interactive elements such as a "Buy Now" button, a "Add to Cart" button, a quantity field, a picture of the item, or the like. The SDP may further include a list of sellers that offer the product. The list may be ordered based on the price each seller offers such that the seller that offers to sell the product at the lowest price may be listed at the top. The list may also be ordered based on the seller ranking such that the highest ranked seller may be listed at the top. The seller ranking may be formulated based on multiple factors, including, for example, the seller's past track record of meeting a promised PDD. External front end system 103 may deliver the SDP to the requesting user device (e.g., via a network).

The requesting user device may receive the SDP which lists the product information. Upon receiving the SDP, the user device may then interact with the SDP. For example, a user of the requesting user device may click or otherwise interact with a "Place in Cart" button on the SDP. This adds the product to a shopping cart associated with the user. The user device may transmit this request to add the product to the shopping cart to external front end system 103.

Figure 1D:
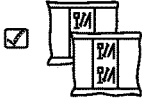
FIG. 1D depicts a sample Cart page that includes items in a virtual shopping cart along with interactive user interface elements, consistent with the disclosed embodiments.
Figure 1E:
FIG. 1E depicts a sample Order page that includes items from the virtual shopping cart along with information regarding purchase and shipping, along with interactive user interface elements, consistent with the disclosed embodiments.

External front end system 103 may generate a Cart page (e.g., FIG. 1D). The Cart page, in some embodiments, lists the products that the user has added to a virtual "shopping cart." A user device may request the Cart page by clicking on or otherwise interacting with an icon on the SRP, SDP, or other pages. The Cart page may, in some embodiments, list all products that the user has added to the shopping cart, as well as information about the products in the cart such as a quantity of each product, a price for each product per item, a price for each product based on an associated quantity, information regarding PDD, a delivery method, a shipping cost, user interface elements for modifying the products in the shopping cart (e.g., deletion or modification of a quantity), options for ordering other product or setting up periodic delivery of products, options for setting up interest payments, user interface elements for proceeding to purchase, or the like. A user at a user device may click on or otherwise interact with a user interface element (e.g., a button that reads "Buy Now") to initiate the purchase of the product in the shopping cart. Upon doing so, the user device may transmit this request to initiate the purchase to external front end system 103.

External front end system 103 may generate an Order page (e.g., FIG. 1E) in response to receiving the request to initiate a purchase. The Order page, in some embodiments, re-lists the items from the shopping cart and requests input of payment and shipping information. For example, the Order page may include a section requesting information about the purchaser of the items in the shopping cart (e.g., name, address, e-mail address, phone number), information about the recipient (e.g., name, address, phone number, delivery information), shipping information (e.g., speed/ method of delivery and/or pickup), payment information (e.g., credit card, bank transfer, check, stored credit), user interface elements to request a cash receipt (e.g., for tax purposes), or the like. External front end system 103 may send the Order page to the user device.

The user device may enter information on the Order page and click or otherwise interact with a user interface element that sends the information to external front end system 103. From there, external front end system 103 may send the information to different systems in system 100 to enable the creation and processing of a new order with the products in the shopping cart.

In some embodiments, external front end system 103 may be further configured to enable sellers to transmit and receive information relating to orders.

Internal front end system 105, in some embodiments, may be implemented as a computer system that enables internal users (e.g., employees of an organization that owns, operates, or leases system 100) to interact with one or more systems in system 100. For example, in embodiments where system 100 enables the presentation of systems to enable users to place an order for an item, internal front end system 105 may be implemented as a web server that enables internal users to view diagnostic and statistical information about orders, modify item information, or review statistics relating to orders. For example, internal front end system 105 may be implemented as a computer or computers running software such as the Apache HTTP Server, Microsoft Internet Information Services (IIS), NGINX, or the like. In other embodiments, internal front end system 105 may run custom web server software designed to receive and process requests from systems or devices depicted in system 100 (as well as other devices not depicted), acquire information from databases and other data stores based on those requests, and provide responses to the received requests based on acquired information.

In some embodiments, internal front end system 105 may include one or more of a web caching system, a database, a search system, a payment system, an analytics system, an order monitoring system, or the like. In one aspect, internal front end system 105 may comprise one or more of these systems, while in another aspect, internal front end system 105 may comprise interfaces (e.g., server-to-server, database-to-database, or other network connections) connected to one or more of these systems.

Transportation system 107, in some embodiments, may be implemented as a computer system that enables communication between systems or devices in system 100 and mobile devices 107A-107C. Transportation system 107, in some embodiments, may receive information from one or more mobile devices 107A-107C (e.g., mobile phones, smart phones, PDAs, or the like). For example, in some embodiments, mobile devices 107A-107C may comprise devices operated by delivery workers. The delivery workers, who may be permanent, temporary, or shift employees, may utilize mobile devices 107A-107C to effect delivery of packages containing the products ordered by users. For example, to deliver a package, the delivery worker may receive a notification on a mobile device indicating which package to deliver and where to deliver it. Upon arriving at the delivery location, the delivery worker may locate the package (e.g., in the back of a truck or in a crate of packages), scan or otherwise capture data associated with an identifier on the package (e.g., a barcode, an image, a text string, an RFID tag, or the like) using the mobile device, and deliver the package (e.g., by leaving it at a front door, leaving it with a security guard, handing it to the recipient, or the like). In some embodiments, the delivery worker may capture photo(s) of the package and/or may obtain a signature using the mobile device. The mobile device may send information to transportation system 107 including information about the delivery, including, for example, time, date, GPS location, photo(s), an identifier associated with the delivery worker, an identifier associated with the mobile device, or the like. Transportation system 107 may store this information in a database (not pictured) for access by other systems in system 100. Transportation system 107 may, in some embodiments, use this information to prepare and send tracking data to other systems indicating the location of a particular package.

In some embodiments, certain users may use one kind of mobile device (e.g., permanent workers may use a specialized PDA with custom hardware such as a barcode scanner, stylus, and other devices) while other users may use other kinds of mobile devices (e.g., temporary or shift workers may utilize off-the-shelf mobile phones and/or smartphones).

In some embodiments, transportation system 107 may associate a user with each device. For example, transportation system 107 may store an association between a user (represented by, e.g., a user identifier, an employee identifier, or a phone number) and a mobile device (represented by, e.g., an International Mobile Equipment Identity (IMEI), an International Mobile Subscription Identifier (IMSI), a phone number, a Universal Unique Identifier (UUID), or a Globally Unique Identifier (GUID)). Transportation system 107 may use this association in conjunction with data received on deliveries to analyze data stored in the database in order to determine, among other things, a location of the worker, an efficiency of the worker, or a speed of the worker.

Seller portal 109, in some embodiments, may be implemented as a computer system that enables sellers or other external entities to electronically communicate with one or more systems in system 100. For example, a seller may utilize a computer system (not pictured) to upload or provide product information, order information, contact information, or the like, for products that the seller wishes to sell through system 100 using seller portal 109.

Shipment and order tracking system 111, in some embodiments, may be implemented as a computer system that receives, stores, and forwards information regarding the location of packages containing products ordered by customers (e.g., by a user using devices 102A-102B). In some embodiments, shipment and order tracking system 111 may request or store information from web servers (not pictured) operated by shipping companies that deliver packages containing products ordered by customers.

In some embodiments, shipment and order tracking system 111 may request and store information from systems depicted in system 100. For example, shipment and order tracking system 111 may request information from transportation system 107. As discussed above, transportation system 107 may receive information from one or more mobile devices 107A-107C (e.g., mobile phones, smart phones, PDAs, or the like) that are associated with one or more of a user (e.g., a delivery worker) or a vehicle (e.g., a delivery truck). In some embodiments, shipment and order tracking system 111 may also request information from warehouse management system (WMS) 119 to determine the location of individual products inside of a fulfillment center (e.g., fulfillment center 200). Shipment and order tracking system 111 may request data from one or more of transportation system 107 or WMS 119, process it, and present it to a device (e.g., user devices 102A and 102B) upon request.

Fulfillment optimization (FO) system 113, in some embodiments, may be implemented as a computer system that stores information for customer orders from other systems (e.g., external front end system 103 and/or shipment and order tracking system 111). FO system 113 may also store information describing where particular items are held or stored. For example, certain items may be stored only in one fulfillment center, while certain other items may be stored in multiple fulfillment centers. In still other embodiments, certain fulfilment centers may be designed to store only a particular set of items (e.g., fresh produce or frozen products). FO system 113 stores this information as well as associated information (e.g., quantity, size, date of receipt, expiration date, etc.).

FO system 113 may also calculate a corresponding PDD (promised delivery date) for each product. The PDD, in some embodiments, may be based on one or more factors. For example, FO system 113 may calculate a PDD for a product based on a past demand for a product (e.g., how many times that product was ordered during a period of time), an expected demand for a product (e.g., how many customers are forecast to order the product during an upcoming period of time), a network-wide past demand indicating how many products were ordered during a period of time, a network-wide expected demand indicating how many products are expected to be ordered during an upcoming period of time, one or more counts of the product stored in each fulfillment center 200, which fulfillment center stores each product, expected or current orders for that product, or the like.

In some embodiments, FO system 113 may determine a PDD for each product on a periodic basis (e.g., hourly) and store it in a database for retrieval or sending to other systems (e.g., external front end system 103, SAT system 101, shipment and order tracking system 111). In other embodiments, FO system 113 may receive electronic requests from one or more systems (e.g., external front end system 103, SAT system 101, shipment and order tracking system 111) and calculate the PDD on demand.

Fulfilment messaging gateway (FMG) 115, in some embodiments, may be implemented as a computer system that receives a request or response in one format or protocol from one or more systems in system 100, such as FO system 113, converts it to another format or protocol, and forward it in the converted format or protocol to other systems, such as WMS 119 or 3rd party fulfillment systems 121A, 121B, or 121C, and vice versa.

Supply chain management (SCM) system 117, in some embodiments, may be implemented as a computer system that performs forecasting functions. For example, SCM system 117 may forecast a level of demand for a particular product based on, for example, based on a past demand for products, an expected demand for a product, a network-wide past demand, a network-wide expected demand, a count products stored in each fulfillment center 200, expected or current orders for each product, or the like. In response to this forecasted level and the amount of each product across all fulfillment centers, SCM system 117 may generate one or more purchase orders to purchase and stock a sufficient quantity to satisfy the forecasted demand for a particular product.

Warehouse management system (WMS) 119, in some embodiments, may be implemented as a computer system that monitors workflow. For example, WMS 119 may receive event data from individual devices (e.g., devices 107A-107C or 119A-119C) indicating discrete events. For example, WMS 119 may receive event data indicating the use of one of these devices to scan a package. As discussed below with respect to fulfillment center 200 and FIG. 2, during the fulfillment process, a package identifier (e.g., a barcode or RFID tag data) may be scanned or read by machines at particular stages (e.g., automated or handheld barcode scanners, RFID readers, high-speed cameras, devices such as tablet 119A, mobile device/PDA 119B, computer 119C, or the like). WMS 119 may store each event indicating a scan or a read of a package identifier in a corresponding database (not pictured) along with the package identifier, a time, date, location, user identifier, or other information, and may provide this information to other systems (e.g., shipment and order tracking system 111).

WMS 119, in some embodiments, may store information associating one or more devices (e.g., devices 107A-107C or 119A-119C) with one or more users associated with system 100. For example, in some situations, a user (such as a part- or full-time employee) may be associated with a mobile device in that the user owns the mobile device (e.g., the mobile device is a smartphone). In other situations, a user may be associated with a mobile device in that the user is temporarily in custody of the mobile device (e.g., the user checked the mobile device out at the start of the day, will use it during the day, and will return it at the end of the day).

WMS 119, in some embodiments, may maintain a work log for each user associated with system 100. For example, WMS 119 may store information associated with each employee, including any assigned processes (e.g., unloading trucks, picking items from a pick zone, rebin wall work, packing items), a user identifier, a location (e.g., a floor or zone in a fulfillment center 200), a number of units moved through the system by the employee (e.g., number of items picked, number of items packed), an identifier associated with a device (e.g., devices 119A-119C), or the like. In some embodiments, WMS 119 may receive check-in and check-out information from a timekeeping system, such as a timekeeping system operated on a device 119A-119C.

3rd party fulfillment (3PL) systems 121A-121C, in some embodiments, represent computer systems associated with third-party providers of logistics and products. For example, while some products are stored in fulfillment center 200 (as discussed below with respect to FIG. 2), other products may be stored off-site, may be produced on demand, or may be otherwise unavailable for storage in fulfillment center 200. 3PL systems 121A-121C may be configured to receive orders from FO system 113 (e.g., through FMG 115) and may provide products and/or services (e.g., delivery or installation) to customers directly. In some embodiments, one or more of 3PL systems 121A-121C may be part of system 100, while in other embodiments, one or more of 3PL systems 121A-121C may be outside of system 100 (e.g., owned or operated by a third party provider).

Fulfillment Center Auth system (FC Auth) 123, in some embodiments, may be implemented as a computer system with a variety of functions. For example, in some embodiments, FC Auth 123 may act as a single-sign on (SSO) service for one or more other systems in system 100. For example, FC Auth 123 may enable a user to log in via internal front end system 105, determine that the user has similar privileges to access resources at shipment and order tracking system 111, and enable the user to access those privileges without requiring a second log in process. FC Auth 123, in other embodiments, may enable users (e.g., employees) to associate themselves with a particular task. For example, some employees may not have an electronic device (such as devices 119A-119C) and may instead move from task to task, and zone to zone, within a fulfillment center 200, during the course of a day. FC Auth 123 may be configured to enable those employees to indicate what task they are performing and what zone they are in at different times of day.

Labor management system (LMS) 125, in some embodiments, may be implemented as a computer system that stores attendance and overtime information for employees (including full-time and part-time employees). For example, LMS 125 may receive information from FC Auth 123, WMS 119, devices 119A-119C, transportation system 107, and/or devices 107A-107C.

The particular configuration depicted in FIG. 1A is an example only. For example, while FIG. 1A depicts FC Auth system 123 connected to FO system 113, not all embodiments require this particular configuration. Indeed, in some embodiments, the systems in system 100 may be connected to one another through one or more public or private networks, including the Internet, an Intranet, a WAN (Wide-Area Network), a MAN (Metropolitan-Area Network), a wireless network compliant with the IEEE 802.11a/b/g/n Standards, a leased line, or the like. In some embodiments, one or more of the systems in system 100 may be implemented as one or more virtual servers implemented at a data center, server farm, or the like.

Figure 2:
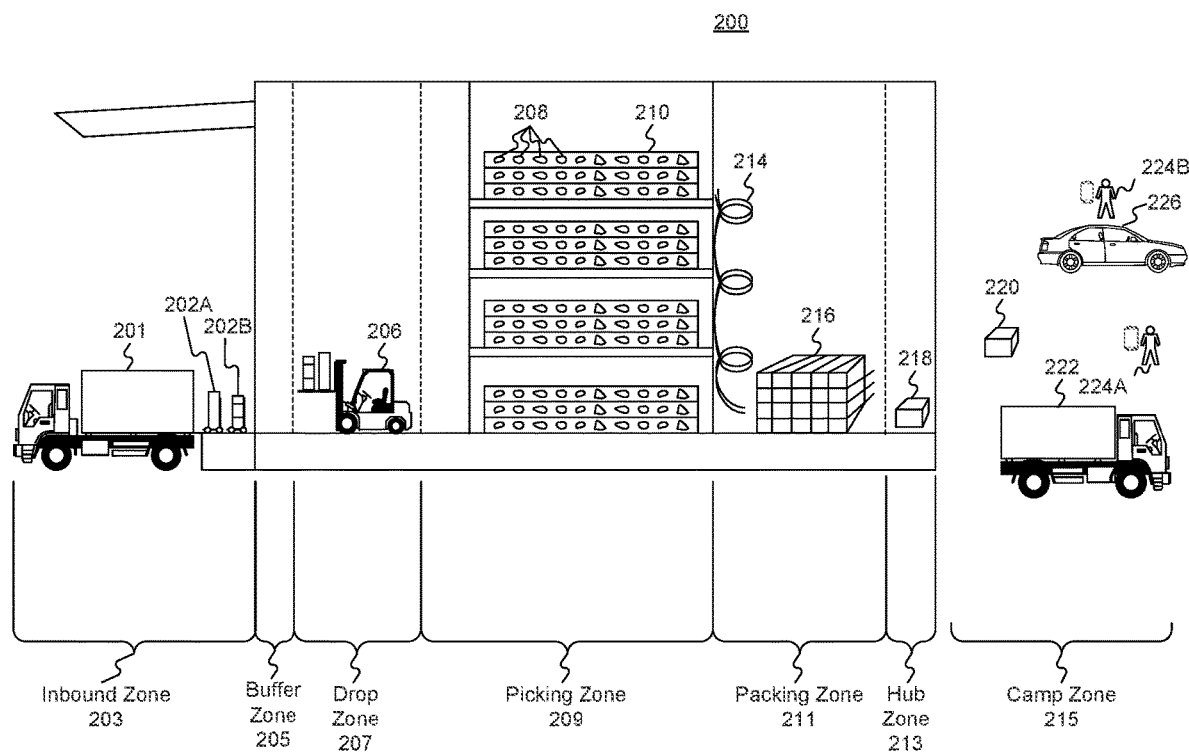
FIG. 2 is a diagrammatic illustration of an exemplary fulfillment center configured to utilize disclosed computerized systems, consistent with the disclosed embodiments.

FIG. 2 depicts a fulfillment center 200. Fulfillment center 200 is an example of a physical location that stores items for shipping to customers when ordered. Fulfillment center (FC) 200 may be divided into multiple zones, each of which are depicted in FIG. 2. These "zones," in some embodiments, may be thought of as virtual divisions between different stages of a process of receiving items, storing the items, retrieving the items, and shipping the items. So while the "zones" are depicted in FIG. 2, other divisions of zones are possible, and the zones in FIG. 2 may be omitted, duplicated, or modified in some embodiments.

Inbound zone 203 represents an area of FC 200 where items are received from sellers who wish to sell products using system 100 from FIG. 1A. For example, a seller may deliver items 202A and 202B using truck 201. Item 202A may represent a single item large enough to occupy its own shipping pallet, while item 202B may represent a set of items that are stacked together on the same pallet to save space.

A worker will receive the items in inbound zone 203 and may optionally check the items for damage and correctness using a computer system (not pictured). For example, the worker may use a computer system to compare the quantity of items 202A and 202B to an ordered quantity of items. If the quantity does not match, that worker may refuse one or more of items 202A or 202B. If the quantity does match, the worker may move those items (using, e.g., a dolly, a handtruck, a forklift, or manually) to buffer zone 205. Buffer zone 205 may be a temporary storage area for items that are not currently needed in the picking zone, for example, because there is a high enough quantity of that item in the picking zone to satisfy forecasted demand. In some embodiments, forklifts 206 operate to move items around buffer zone 205 and between inbound zone 203 and drop zone 207. If there is a need for items 202A or 202B in the picking zone (e.g., because of forecasted demand), a forklift may move items 202A or 202B to drop zone 207.

Drop zone 207 may be an area of FC 200 that stores items before they are moved to picking zone 209. A worker assigned to the picking task (a "picker") may approach items 202A and 202B in the picking zone, scan a barcode for the picking zone, and scan barcodes associated with items 202A and 202B using a mobile device (e.g., device 119B). The picker may then take the item to picking zone 209 (e.g., by placing it on a cart or carrying it).

Picking zone 209 may be an area of FC 200 where items 208 are stored on storage units 210. In some embodiments, storage units 210 may comprise one or more of physical shelving, bookshelves, boxes, totes, refrigerators, freezers, cold stores, or the like. In some embodiments, picking zone 209 may be organized into multiple floors. In some embodiments, workers or machines may move items into picking zone 209 in multiple ways, including, for example, a forklift, an elevator, a conveyor belt, a cart, a handtruck, a dolly, an automated robot or device, or manually. For example, a picker may place items 202A and 202B on a handtruck or cart in drop zone 207 and walk items 202A and 202B to picking zone 209.

A picker may receive an instruction to place (or "stow") the items in particular spots in picking zone 209, such as a particular space on a storage unit 210. For example, a picker may scan item 202A using a mobile device (e.g., device 119B). The device may indicate where the picker should stow item 202A, for example, using a system that indicate an aisle, shelf, and location. The device may then prompt the picker to scan a barcode at that location before stowing item 202A in that location. The device may send (e.g., via a wireless network) data to a computer system such as WMS 119 in FIG. 1A indicating that item 202A has been stowed at the location by the user using device 119B.

Once a user places an order, a picker may receive an instruction on device 119B to retrieve one or more items 208 from storage unit 210. The picker may retrieve item 208, scan a barcode on item 208, and place it on transport mechanism 214. While transport mechanism 214 is represented as a slide, in some embodiments, transport mechanism may be implemented as one or more of a conveyor belt, an elevator, a cart, a forklift, a handtruck, a dolly, a cart, or the like. Item 208 may then arrive at packing zone 211.

Packing zone 211 may be an area of FC 200 where items are received from picking zone 209 and packed into boxes or bags for eventual shipping to customers. In packing zone 211, a worker assigned to receiving items (a "rebin worker") will receive item 208 from picking zone 209 and determine what order it corresponds to. For example, the rebin worker may use a device, such as computer 119C, to scan a barcode on item 208. Computer 119C may indicate visually which order item 208 is associated with. This may include, for example, a space or "cell" on a wall 216 that corresponds to an order. Once the order is complete (e.g., because the cell contains all items for the order), the rebin worker may indicate to a packing worker (or "packer") that the order is complete. The packer may retrieve the items from the cell and place them in a box or bag for shipping. The packer may then send the box or bag to a hub zone 213, e.g., via forklift, cart, dolly, handtruck, conveyor belt, manually, or otherwise.

Hub zone 213 may be an area of FC 200 that receives all boxes or bags ("packages") from packing zone 211. Workers and/or machines in hub zone 213 may retrieve package 218 and determine which portion of a delivery area each package is intended to go to, and route the package to an appropriate camp zone 215. For example, if the delivery area has two smaller sub-areas, packages will go to one of two camp zones 215. In some embodiments, a worker or machine may scan a package (e.g., using one of devices 119A-119C) to determine its eventual destination. Routing the package to camp zone 215 may comprise, for example, determining a portion of a geographical area that the package is destined for (e.g., based on a postal code) and determining a camp zone 215 associated with the portion of the geographical area.

Camp zone 215, in some embodiments, may comprise one or more buildings, one or more physical spaces, or one or more areas, where packages are received from hub zone 213 for sorting into routes and/or sub-routes. In some embodiments, camp zone 215 is physically separate from FC 200 while in other embodiments camp zone 215 may form a part of FC 200.

Workers and/or machines in camp zone 215 may determine which route and/or sub route a package 220 should be associated with, for example, based on a comparison of the destination to an existing route and/or sub-route, a calculation of workload for each route and/or sub-route, the time of day, a shipping method, the cost to ship the package 220, a PDD associated with the items in package 220, or the like. In some embodiments, a worker or machine may scan a package (e.g., using one of devices 119A-119C) to determine its eventual destination. Once package 220 is assigned to a particular route and/or sub route, a worker and/or machine may move package 220 to be shipped. In exemplary FIG. 2, camp zone 215 includes a truck 222, a car 226, and delivery workers 224A and 224B. In some embodiments, truck 222 may be driven by delivery worker 224A, where delivery worker 224A is a full-time employee that delivers packages for FC 200 and truck 222 is owned, leased, or operated by the same company that owns, leases, or operates FC 200. In some embodiments, car 226 may be driven by delivery worker 224B, where delivery worker 224B is a "flex" or occasional worker that is delivering on an as-needed basis (e.g., seasonally). Car 226 may be owned, leased, or operated by delivery worker 224B.

Figure 3:
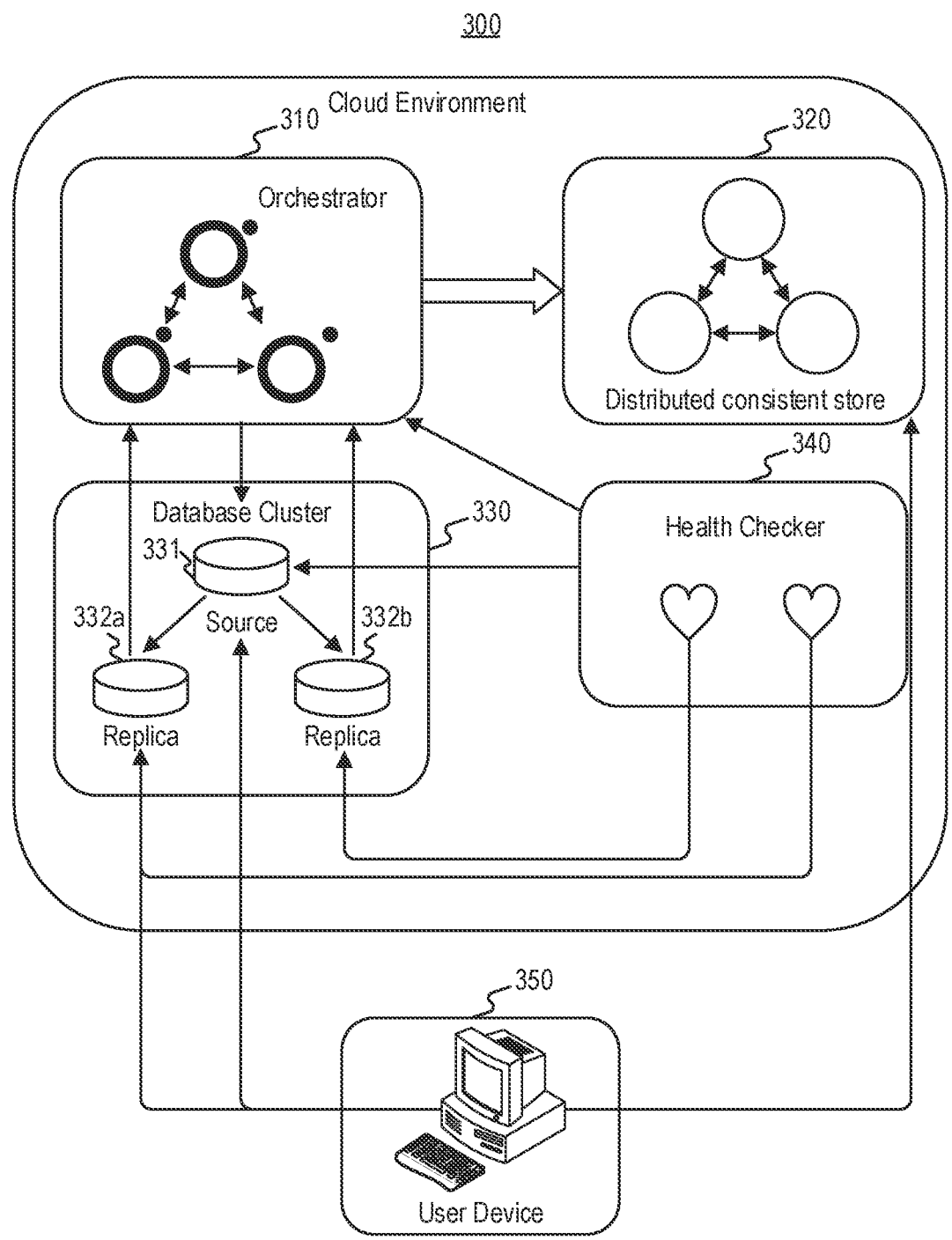
FIG. 3 is a schematic block diagram illustrating an exemplary embodiment of a cloud environment comprising a distributed database and a system for managing the distributed database, consistent with the disclosed embodiments.

FIG. 3 is a schematic block diagram illustrating an exemplary embodiment of a cloud environment 300 comprising a distributed database and a system for managing the distributed database. Cloud environment 300 may comprise a variety of computerized systems, each of which may be connected to each other via one or more networks. In some embodiments, each of the elements depicted in FIG. 3 may represent a group of systems, individual systems in a network of systems, functional units or modules inside a system, or any combination thereof. And in some embodiments, each of the elements may communicate with each other via one or more public or private network connections including the Internet, an intranet, a WAN (Wide-Area Network), a MAN (Metropolitan-Area Network), a wireless network compliant with the IEEE 802.11a/b/g/n Standards, a wired network, or the like. The individual systems may also be located within one geographical location or be geographically dispersed.

In some embodiments, the depicted systems may include an orchestrator 310, a distributed consistent store 320, a database cluster 330 including a source node 331 and a plurality of replica nodes 332 (depicted are two replica nodes 332a and 332b), a health checker 340, and a user device 350. While only two replica nodes 332a and 332b are depicted in FIG. 3, the number is only exemplary and fewer or additional replica nodes may be implemented.

Each system depicted in FIG. 3 may take the form of a server, general-purpose computer, a mainframe computer, a special-purpose computing device such as a graphical processing unit (GPU), laptop, or any combination of these computing devices. In other embodiments, each system or a subset of the systems may be implemented as one or more functional units of a single system. Additionally or alternatively, each system or a subset thereof may be a standalone system, or a part of a subsystem, which may be part of a larger system.

Orchestrator 310, in some embodiments, may be any computerized system configured to manage the topology of database cluster 330. The topology of a database cluster refers to the arrangement of the elements (i.e., nodes) in a network of connected databases. For example, the topology of database cluster 330 may be described as three nodes, with a source node which serves write queries (i.e., source node 331) and two replica nodes which serve read queries (i.e., replica nodes 332a and 332b). In some embodiments, orchestrator 310 may determine that source node 331 and/or one or more replica nodes 332 are not available. Upon this determination, orchestrator 310 may trigger a failover method which may replace the failed nodes with healthy nodes and update consistent store 320 with the new topology of database cluster 330. Orchestrator 310 may be a relational database management system (RDBMS) such as, but not limited to, Oracle Database, MySQL, Microsoft SQL Server, and IBM DB2. In some embodiments, orchestrator 310 may be distributed such that should one server endpoint of orchestrator 310 fail, one or more endpoints remain to continue managing database cluster 330.

Distributed consistent store 320, in some embodiments, may be any computerized system configured to store information relating to the topology of database cluster 330 and also configured to send notifications regarding the topology of database cluster 330 to user device 350. Consistent store 320 may be a relational database where data stored therein is organized in one or more data sets. For example, consistent store 320 may contain information labeling source node 331 as the source node and replica nodes 332a and 332b as replica nodes. Additionally, consistent store 320 may contain information regarding the current connections user device 350 maintains with database cluster 330, user device 350 data and statistics, and a last seen time corresponding to the last time either orchestrator 310, health checker 340, and/or user device 350 interacted with consistent store 320. In some embodiments, consistent store 320 may be equipped to send a notification to user device 350 to record the new database topology of database cluster 330.

In other embodiments, consistent store 320 may be able to detect whether user device 350 has updated its database topology following the notification. This detection may be the result of consistent store 320 retrieving data from user device 350 and/or user device 350 sending data of its current database topology to consistent store 320. Consistent store 320 may be distributed such that one or more nodes store the same or complementary data relating to the topology of database cluster 330. This may prevent data loss in the event of node failure. The nodes of consistent store 320 may all be configured to read and write, or these tasks may be distributed among the plurality of nodes. Compared to conventional databases, separating the read and write functionalities into dedicated nodes allows each functionality to take place without being intermingled with the other, thus lowering the risk of write or read errors.

Database cluster 330, in some embodiments, may be a computerized system configured to collect, organize, and store various data. Database cluster 330 may be a relational database where data stored therein is organized in one or more data sets. Database cluster 330 may include data such as that stored in or accessed by SAT system 101, external front end system 103, internal front end system 105, transportation system 107, SOT system 111, FO system 113, SCM system 117, warehouse management system 119, 3rd party fulfillment systems 121A, 121B, and 121C, FC Auth 123, and/or LMS 125.

Database cluster 330 may include a source node 331 and one or more replica nodes 332a and 332b. Source node 331 may be configured to process write requests sent by user device 350, while replica nodes 332a and 332b may be configured to process read requests sent by user device 350. Contrary to conventional nodes that are configured to both accept new data for storage and make the data available for client devices (e.g., user device 350), source node 331 may be configured solely to collect and maintain the latest data set by accepting new data from user device 350. Each replica node 332a/332b may further be configured to store data identical to those stored in source node 331. For example, if source node 331 includes data sets 1-10 (i.e., a master set), each replica node 332 may be configured to replicate and store data sets 1-10. As discussed above, separating the read and write functionalities into dedicated nodes lowers the risk of write or read errors. Each replica node 332 has the ability to be promoted to a source node should source node 331 fail and orchestrator 310 trigger a failover.

Health checker 340, in some embodiments, may be any computerized system configured to ensure the topology of database cluster 330 matches the topology of database cluster 330 stored in consistent store 320 and to check the health of source node 331 and replica nodes 332a/332b. For example, health checker 340 may monitor consistent store 320 and database cluster 330 in a specific time interval to ensure that both the topology of database cluster 330 and the labeling in consistent store 320 matches. If health checker 340 determines that these data do not match—this may occur, for example, if there is a network error between orchestrator 310 switching the role of one of replica nodes 332a or 332b in database cluster 330 and updating consistent store 320—health checker 340 may update consistent store 320 itself, without going through orchestrator 310, to reflect the current topology of database cluster 330. Health checker 340 increases the resiliency of a system which is expected to be available continuously as it reduces the possibility of a rare error (e.g., network failure) impacting the performance of the system.

User device 350, in some embodiments, may be any computerized system configured to allow a user to read and/or write data in database cluster 330. User device 350 may be one or more of mobile device 102A, computer 102B, mobile devices 107A, 107B, and 107C, external front end system 103, internal front end system 105, mobile devices 119A, 119B, and 119C, or any other system depicted in FIG. 1A.

In some embodiments, user device 350 may be configured to receive notifications from consistent store 320, automatically update source and replica endpoints based on the notification, and replace the connections to consistent store 320 using the updated endpoints. In other embodiments, the update of the source and replica endpoints may take place only following user input. In yet other embodiments, user device 350 may be configured to send a confirmation receipt to consistent store 320 once user device 350 has updated its log of the topology of database cluster 330 following a notification from consistent store 320. User device 350 may be a personal computing device including, but not limited to, a smartphone, a laptop or notebook computer, a tablet, a multifunctional watch, a pair of multifunctional glasses, any mobile or wearable device with computing ability, or any combination of these computers and/or affiliated components.

Figure 4A:
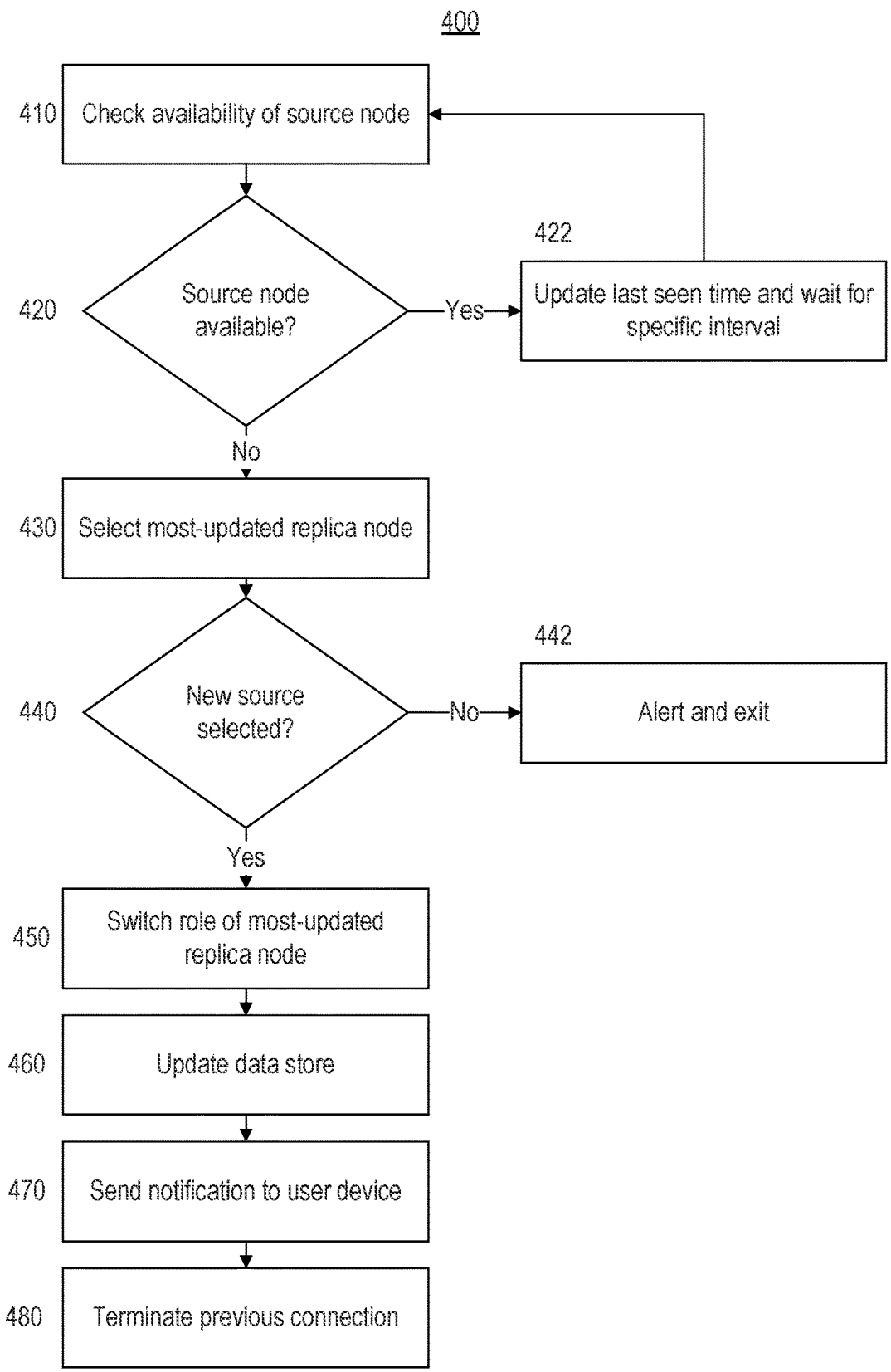
FIG. 4A is a flowchart of an exemplary computerized method for replacing a source node with a replica node following a failure of the source node, consistent with the disclosed embodiments.

FIG. 4A is a flowchart of an exemplary computerized method 400 for replacing source node 331 with a replica node following a failure of source node 331. Method 400 may be performed in 1-10 seconds, a substantial improvement from previous solutions. Method 400 may be implemented utilizing data stored in any server that must service a large number of queries such as, for example, SAT system 101, external front end system 103, internal front end system 105, transportation system 107, SOT system 111, FO system 113, SCM system 117, warehouse management system 119, 3rd party fulfillment systems 121A, 121B, and 121C, FC Auth 123, and/or LMS 125. Such server may comprise networked systems such as those described above in FIG. 3. Method 400 is described below with reference to the networked systems of FIG. 3, but any other configuration of systems, subsystems, or modules may be used to perform method 400.

At step 410, orchestrator 310 and/or health checker 340 may check the availability of source node 331. Checking the availability of source node 331 and/or one or more replica nodes 332a and 332b may be accomplished by a detecting a number of failure scenarios, such as a failed source node, a failed source node and failed replica nodes, a failed source node and some failed replica nodes, an unreachable source node, an unreachable source node with lagging replica nodes, not all replica nodes are replicating the source node data, not all replica nodes are replicating the source node data or have failed, a failed co-source node (should the system have more than one source node), a failed co-source node and failed replica nodes, a failed replica node which itself has replicas, a failed replica node which itself has one replica which is failing to connect, a failed replica node which itself has one replica, a failed replica node which itself has one or more replicas which have failed, a failed replica node which itself has one or more replicas—some of which have failed, all replica nodes which themselves have one or more replicas have failed or are unable to connect, an unreachable replica node which itself has one or more replicas is unreachable, an unreachable replica node which itself has one or more replicas which are lagging is unreachable.

The failure scenarios may be detected by attempting to reach and/or access source node 331 and/or one or more replica nodes 332a and 332b, determining one or more replica nodes is failing replication, determining source node 331 and/or one or more replica nodes 332a and 332b are lagging, and other methods for detecting failure scenarios.

In other embodiments, orchestrator 310 and/or health checker 340 may use synthetic monitoring to simulate an action or path that a user using user device 350 may take on each node in database cluster 330 to check the availability of source node 321 and/or one or more replica nodes. The actions or paths may then be continuously monitored at predetermined intervals to test the availability of each node. Should the actions or paths be completed successfully, orchestrator 310 and/or health checker 340 may determine that the node is available. Further, depending on the scale and the desired availability of the system, the predetermined intervals could range anywhere from milliseconds to hours. Other methods for checking the availability of the nodes include attempting to open a connection to the nodes, executing a read query against the nodes, executing a non-cached write query against the nodes, executing a prewritten function or procedure that checks for the availability of the nodes, and/or any other method for checking the availability of a database.

At step 420, orchestrator 310 and/or health checker 340 may determine whether source node 331 is available from the data collected at step 410. Should source node 331 be available, method 400 may proceed to step 422, where orchestrator 310 and/or health checker 340 may update a last seen time in consistent store 320 and wait for a specific interval of time before checking the availability of source node 331 once again.

However, if source node 331 is not available, method 400 may proceed to step 430, where orchestrator 310 may select a most-updated replica node from the one or more replica nodes 332. If health checker 340 determined that source node 331 is not available, health checker 340 may notify orchestrator 310 that source node 331 is not available, also triggering step 430. The most-updated replica node may be, as its name would suggest, the last replica node 332a or 332b to have been updated with the data from source node 331 before it failed. Orchestrator 310 may store an instance or list identifying the most-updated replica node and/or may pull data relating to the most-updated replica node from SAT system 101, external front end system 103, internal front end system 105, transportation system 107, SOT system 111, FO system 113, SCM system 117, warehouse management system 119, 3rd party fulfillment systems 121A, 121B, and 121C, FC Auth 123, and/or LMS 125.

At step 440, orchestrator 310 may check to see whether it has selected a replica node 332 before continuing to ensure the failover process is carried out correctly. Should orchestrator 310 determine that no replica node 332 has been selected, method 400 may proceed to step 442, where orchestrator 310 may alert a system administrator (e.g., by sending a text message, email message, push notification, or other message/notification), exit method 400, and potentially begin method 400 again at step 410 or step 430.

Alternatively, orchestrator 310 may determine that a replica node 332 has indeed been selected and method 400 may proceed to step 450. For the purpose of this illustration, we may assume that the most-updated replica node in this case was 332a. At step 450, orchestrator 310 may switch the role of replica node 332a from "replica" to "source," also known as source or master promotion, converting replica node 332a into promoted source node 332a. This may take place by executing one or more "set" commands in SQL or a similar function in whichever language is being utilized. For example, orchestrator 310 may use a "set" command to set replica node 322a as "writable." Additionally or alternatively, orchestrator 310 may remove the role of source node 331 by using a "set" command to set source node 331 to be "read-only" or "super-read-only," converting source node 331 into demoted source node 331.

At step 460, orchestrator 310 may update the labels in consistent store 320 to reflect the updated topology of database cluster 330. For example, orchestrator 310 may modify the labels in consistent store 320 as follows: label demoted source node 331 as "not available," label promoted source node 332a (i.e., previously replica node 332a) as "source," and label replica node 332b as "replica." Orchestrator 310 may also update the last seen time in consistent store 320 at this time. In some embodiments, orchestrator 310 may update the domain name system (DNS) of promoted source node 332a and record this in consistent store 320 to let user device 350 know that the Internet protocol (IP) of the source node it may connect to has changed.

At step 470, consistent store 320 may send a notification to user device 350 to update its log of the topology of database cluster 330 based on the update received from orchestrator 310. Consistent store 320 may determine whether user device 350 has updated its log of the database cluster 330 topology based on the most recent update. If the determination shows that user device 350 has not yet updated its log of the database cluster 330 topology after a specific time interval, consistent store 320 may send another notification instructing user device 350 once again to update its log of the database cluster 330 topology. Before, during, or after receiving the confirmation from user device 350, method 400 may proceed to step 480, where orchestrator 310 may terminate the connection between user device 350 and demoted source node 331 and restart the connection between user device 350 and promoted source node 332a by executing a "set" command and a "start" command, respectively, in SQL or the like. Orchestrator 310 may also terminate the connections by, for example, forcing demoted source node 331 offline, creating a dynamic KILL statement for each connection, and/or altering demoted source node 331 to having a single or restricted user. An additional and/or alternative method for updating the log of the topology on user device 350 is explained in more detail below with reference to FIG. 5.

Figure 4B:
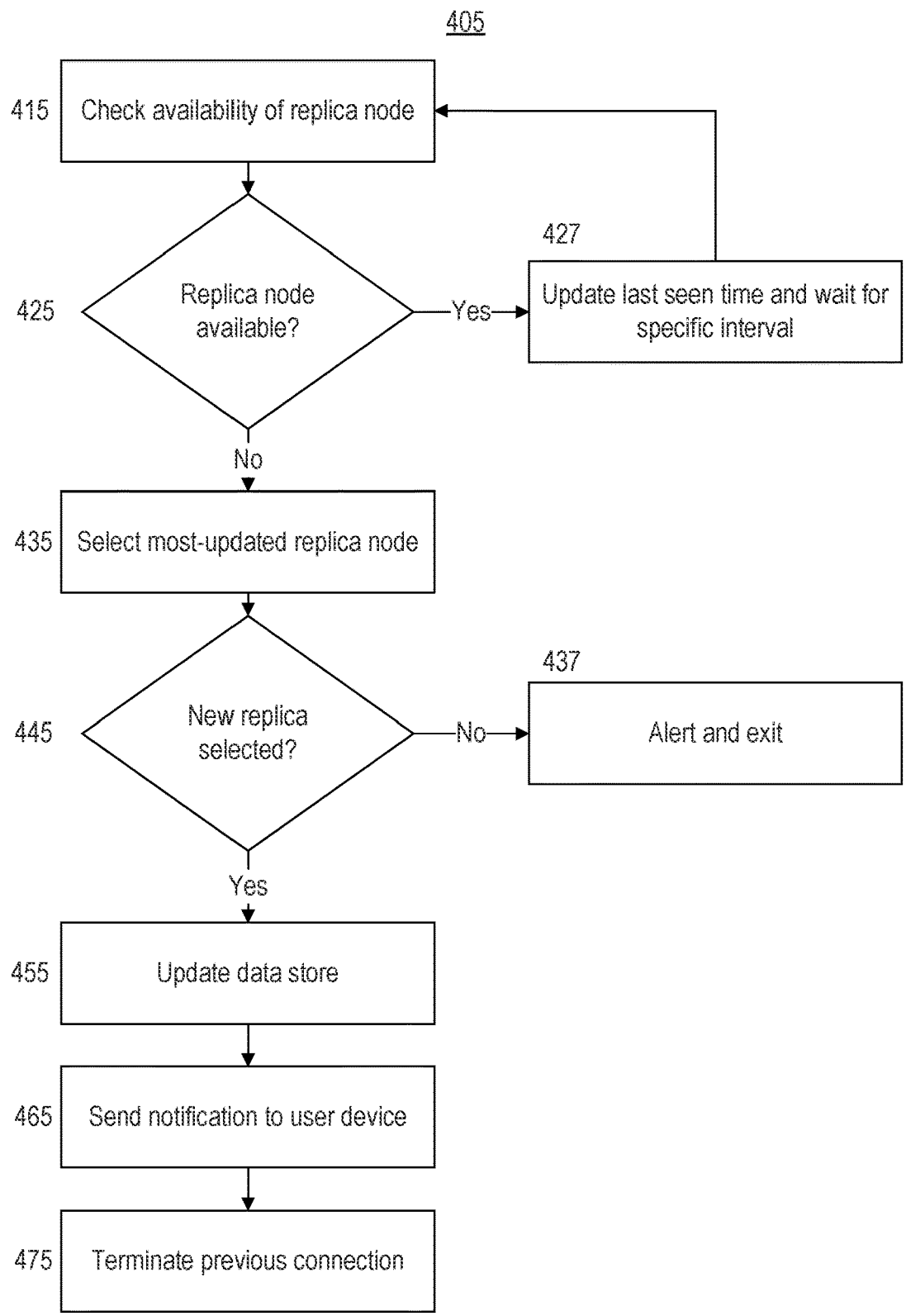
FIG. 4B is a flowchart of an exemplary computerized method for replacing a replica node following a failure of the replica node, consistent with the disclosed embodiments.

Similarly, FIG. 4B is a flowchart of an exemplary computerized method 405 for replacing replica node 332a with another replica node following a failure of replica node 332a. Method 405 may be performed in 1-10 seconds, a substantial improvement from previous solutions. Method 405 may be implemented utilizing data stored in any server that must service a large number of queries such as, for example, SAT system 101, external front end system 103, internal front end system 105, transportation system 107, SOT system 111, FO system 113, SCM system 117, warehouse management system 119, 3rd party fulfillment systems 121A, 121B, and 121C, FC Auth 123, and/or LMS 125. Such server may comprise networked systems such as those described above in FIG. 3. Method 405 is described below with reference to the networked systems of FIG. 3, but any other configuration of systems, subsystems, or modules may be used to perform method 405.

At step 415, orchestrator 310 and/or health checker 340 may check the availability of replica node 332a. Checking the availability of source node 331 and/or one or more replica nodes 332a and 332b may be accomplished by a detecting a number of failure scenarios, such as a failed source node, a failed source node and failed replica nodes, a failed source node and some failed replica nodes, an unreachable source node, an unreachable source node with lagging replica nodes, not all replica nodes are replicating the source node data, not all replica nodes are replicating the source node data or have failed, a failed co-source node (should the system have more than one source node), a failed co-source node and failed replica nodes, a failed replica node which itself has replicas, a failed replica node which itself has one replica which is failing to connect, a failed replica node which itself has one replica, a failed replica node which itself has one or more replicas which have failed, a failed replica node which itself has one or more replicas—some of which have failed, all replica nodes which themselves have one or more replicas have failed or are unable to connect, an unreachable replica node which itself has one or more replicas is unreachable, an unreachable replica node which itself has one or more replicas which are lagging is unreachable.

The failure scenarios may be detected by attempting to reach and/or access source node 331 and/or one or more replica nodes 332a and 332b, determining one or more replica nodes is failing replication, determining source node 331 and/or one or more replica nodes 332a and 332b are lagging, and other methods for detecting failure scenarios.

In other embodiments, orchestrator 310 and/or health checker 340 may use synthetic monitoring to simulate an action or path that a user using user device 350 may take on each node in database cluster 330 to check the availability of source node 321 and/or one or more replica nodes. The actions or paths may then be continuously monitored at predetermined intervals to test the availability of each node. Should the actions or paths be completed successfully, orchestrator 310 and/or health checker 340 may determine that the node is available. Further, depending on the scale and the desired availability of the system, the predetermined intervals could range anywhere from milliseconds to hours. Other methods for checking the availability of the nodes include attempting to open a connection to the nodes, executing a read query against the nodes, executing a non-cached write query against the nodes, executing a prewritten function or procedure that checks for the availability of the nodes, and/or any other method for checking the availability of a database.

At step 425, orchestrator 310 and/or health checker 340 may determine whether replica node 332a is available from the data collected at step 415. Should replica node 332a be available, method 405 may proceed to step 427, where orchestrator 310 and/or health checker 340 may update a last seen time in consistent store 320 and wait for a specific interval of time before checking the availability of replica node 332a once again.

However, if replica node 332a is not available, method 405 may proceed to step 435, where orchestrator 310 may select a most-updated replica node from the one or more replica nodes 332, excluding replica node 332a. If health checker 340 determined that replica node 332a is not available, health checker 340 may notify orchestrator 310 that replica node 332a is not available, also triggering step 435. The most-updated replica node may be, as its name would suggest, the last replica node 332 to have been updated with the data from source node 331 before or after replica node 332a failed. Orchestrator 310 may store an instance or list identifying the most-updated replica node and/or may pull data relating to the most-updated replica node from SAT system 101, external front end system 103, internal front end system 105, transportation system 107, SOT system 111, FO system 113, SCM system 117, warehouse management system 119, 3rd party fulfillment systems 121A, 121B, and 121C, FC Auth 123, and/or LMS 125.

At step 445, orchestrator 310 may check to see whether it has selected a replica node 332 before continuing to ensure the failover process is carried out correctly. Should orchestrator 310 determine that no replica node 332 has been selected, method 405 may proceed to step 447, where orchestrator 310 may alert a system administrator (e.g., by sending a text message, email message, push notification, or other message/notification), exit method 405, and potentially begin method 405 again at step 415 or step 435.

Alternatively, orchestrator 310 may determine that a replica node 332 has indeed been selected and method 405 may proceed to step 455. For the purpose of this illustration, we may assume that the most-updated replica node in this case was 332b. At step 455, orchestrator 310 may update the labels in consistent store 320 to reflect the updated topology of database cluster 330. For example, orchestrator 310 may modify the labels in consistent store 320 as follows: label replica node 332a as "not available," label source node 331 as "source," and label replica node 332b as "replica." Orchestrator 310 may also update the last seen time in consistent store 320 at this time. In some embodiments, orchestrator 310 may update the domain name system (DNS) of replica node 332b and record this in consistent store 320 to let user device 350 know that the Internet protocol (IP) of the replica node it may connect to has changed.

At step 465, consistent store 320 may send a notification to user device 350 to update its log of the topology of database cluster 330 based on the update received from orchestrator 310. Consistent store 320 may determine whether user device 350 has updated its log of the database cluster 330 topology based on the most recent update. If the determination shows that user device 350 has not yet updated its log of the database cluster 330 topology after a specific time interval, consistent store 320 may send another notification instructing user device 350 once again to update its log of the database cluster 330 topology.

Before, during, or after receiving the confirmation from user device 350, method 405 may proceed to step 475, where orchestrator 310 may terminate the connection between user device 350 and replica node 332a and start a new connection between user device 350 and replica node 332b by executing a "set" command and a "start" command, respectively, in SQL or the like. Orchestrator 310 may also terminate the connections by, for example, forcing source node 331 offline, creating a dynamic KILL statement for each connection, and/or altering source node 331 to having a single or restricted user. This step may ensure that user device 350 remains connected to a node which serves read commands.

Figure 5:
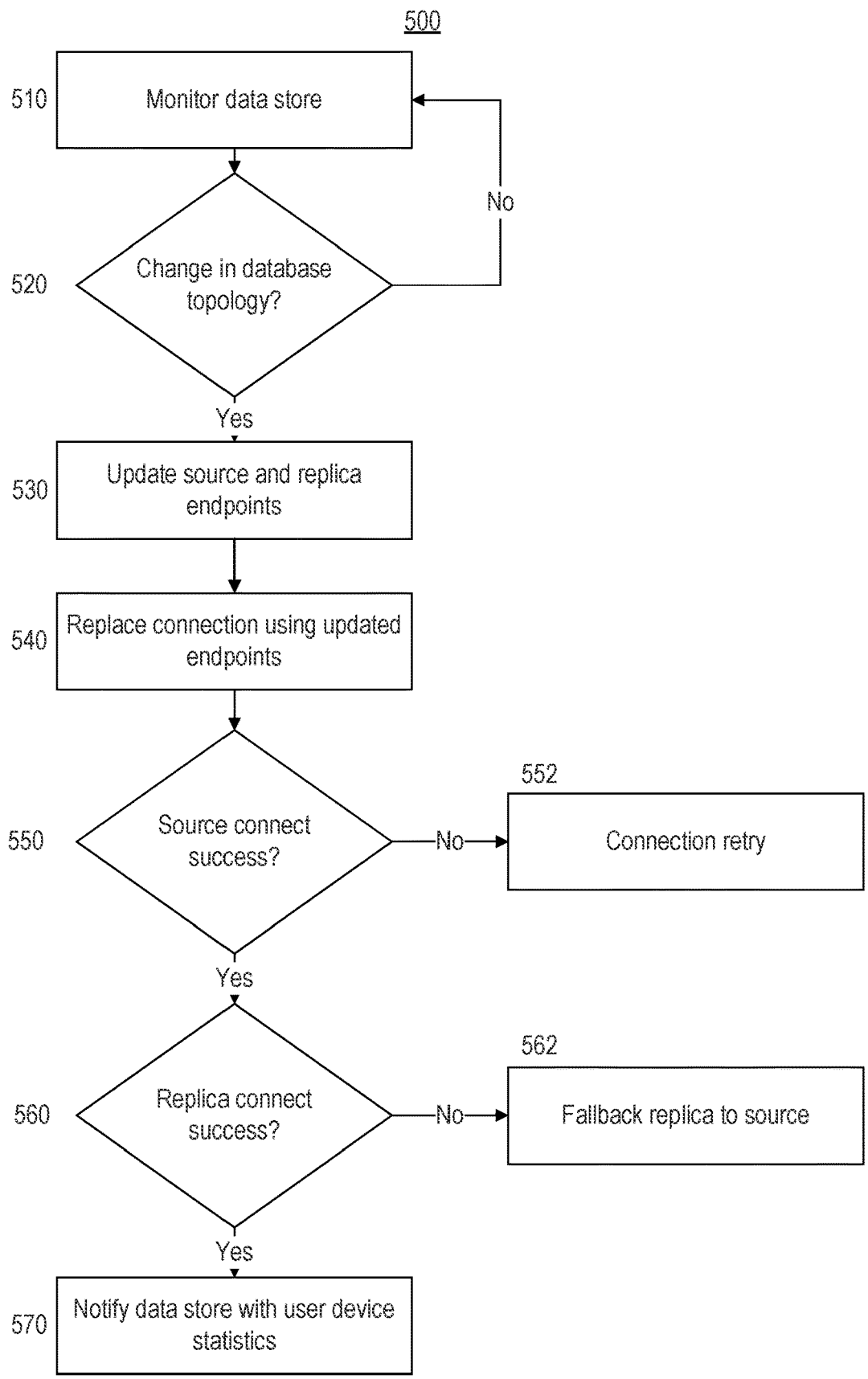
FIG. 5 is a flowchart of an exemplary computerized method for replacing a connection from a user device to a database after a change in the topology of the database, consistent with the disclosed embodiments.

FIG. 5 is a flowchart of an exemplary computerized method 500 for replacing a connection from user device 350 to database cluster 330 after a change in the topology of database cluster 330. Method 500 may be implemented utilizing data stored in any server that must service a large number of queries such as, for example, SAT system 101, external front end system 103, internal front end system 105, transportation system 107, SOT system 111, FO system 113, SCM system 117, warehouse management system 119, 3rd party fulfillment systems 121A, 121B, and 121C, FC Auth 123, and/or LMS 125. Such server may comprise networked systems such as those described above in FIG. 3. Method 500 is described below with reference to the networked systems of FIG. 3, but any other configuration of systems, subsystems, or modules may be used to perform method 500.

At step 510, user device 350 may monitor consistent store 320 looking for any updates which may show a change in the topology of database cluster 330. If, at step 520, user device 350 determines that there have not been any updates to consistent store 320, user device 350 may wait for a predetermined time interval and method 500 may return to step 510. However, if user device 350 determines that consistent store 320 has been updated to reflect a change in the topology of database cluster 330, method 500 may proceed to step 530.

At step 530, user device 350 may update the source and replica endpoints identifying which nodes in database cluster 330 serve which role. For example, if consistent store 320 has been updated to label source node 331 as "not available," replica node 332a as a "source" node, and replica node 332b as a "replica" node, then user device 350 will modify its endpoint data to identify each node consistently with consistent store 320.

At step 540, user device 350 may use the updated endpoints to replace the previous connection (e.g., connected to source node 331 to serve write requests and to replica node 332a to serve read requests) with a new connection (e.g., connected to replica node 332a to serve write requests and to replica node 332b to serve read requests). The replacement may take place automatically or following user input.

Following step 540, user device 350 may perform checks to ensure the connection replacement was a success. At step 550, if the connection to the promoted source node (e.g., replica node 332a) was not successful, user device 350 may attempt to connect to the promoted source node (e.g., replica node 332a) until the connection is successful. And at step 560, if the connection to the replica node (e.g., replica node 332b) was not successful, user device 350 may connect to the promoted source node (e.g., replica node 332a) instead and allow it to serve both write and read requests. At step 570, user device 350 may notify consistent store 350 of the successful update and supply consistent store 350 with device statistics.

Figure 6:
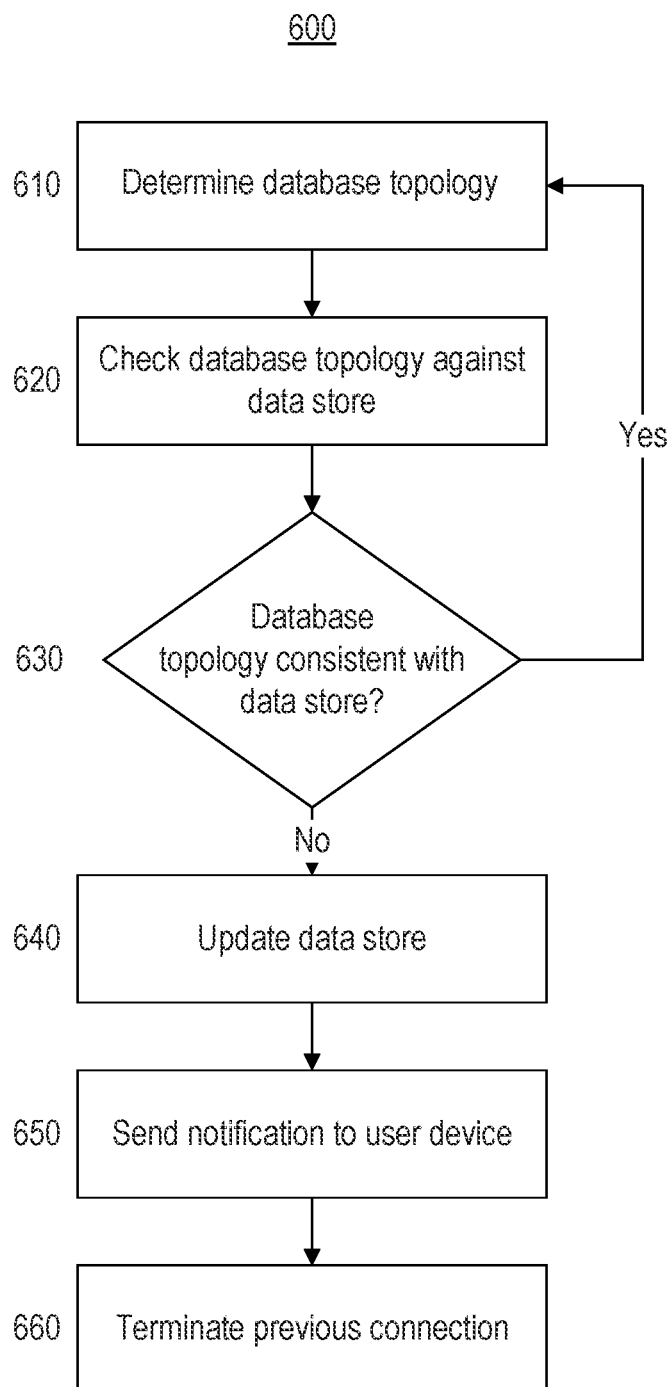
FIG. 6 is a flowchart of an exemplary computerized method for ensuring the database topology is consistent with a data store, consistent with the disclosed embodiments.

FIG. 6 is a flowchart of an exemplary computerized method 600 for ensuring the database topology is consistent with consistent store 320, and by extension, user device 350. Method 600 may be implemented utilizing data stored in any server that must service a large number of queries such as, for example, SAT System 101, SOT system 111, and/or FO system 113. Such server may comprise networked systems such as those described above in FIG. 3. Method 600 is described below with reference to the networked systems of FIG. 3, but any other configuration of systems, subsystems, or modules may be used to perform method 600.

At step 610, health checker 340 may determine the current topology of database cluster 330 by checking the role of each node in database cluster 330.

At step 620, health checker 340 may check the topology of database cluster 330 against the labeling in consistent store 320 to determine whether the labeling in consistent store 320 is up-to-date and consistent with the database topology.

At step 630, if the determination is that the labeling and the topology are consistent, health checker 340 may wait for a predetermined time interval and method 600 may return to step 610. However, if the labeling and the topology are not consistent, i.e., at least one node is incorrectly labeled, method 600 may proceed to step 640, where health checker 340 may update consistent store 320 to reflect the current topology of database cluster 330. The aforementioned may happen, for example, if there is an error between orchestrator 310 switching the role of one or more nodes in database cluster 330 and updating consistent store 320 with the new labels.

At step 650, consistent store 320 sends a notification to user device 350 to update its log of the topology of database cluster 330 based on the update received from health checker 340. Consistent store 320 may determine whether user device 350 has updated its log of the database cluster 330 topology based on the most recent update. If the determination shows that user device 350 has not yet updated its log of the database cluster 330 topology after a specific time interval, consistent store 320 may send another notification instructing user device 350 once again to update its log of the database cluster 330 topology. At the same time, before, or after receiving the confirmation from user device 350, method 600 may proceed to step 660, where orchestrator 480 may terminate a connection between user device 350 and a failed node (i.e., a demoted source node 331 or a failed replica node 332a or 332b) and restart a connection between user device 350 and an appropriate node, as determined by the database topology in consistent store 320, by executing a "set" command and a "start" command, respectively, in SQL or the like. Orchestrator 310 may also terminate the connection by, for example, forcing source node 331 offline, creating a dynamic KILL statement for each connection, and/or altering source node 331 to having a single or restricted user.

While the present disclosure has been shown and described with reference to particular embodiments thereof, it will be understood that the present disclosure can be practiced, without modification, in other environments. The foregoing description has been presented for purposes of illustration. It is not exhaustive and is not limited to the precise forms or embodiments disclosed. Modifications and adaptations will be apparent to those skilled in the art from consideration of the specification and practice of the disclosed embodiments. Additionally, although aspects of the disclosed embodiments are described as being stored in memory, one skilled in the art will appreciate that these aspects can also be stored on other types of computer readable media, such as secondary storage devices, for example, hard disks or CD ROM, or other forms of RAM or ROM, USB media, DVD, Blu-ray, or other optical drive media.

Computer programs based on the written description and disclosed methods are within the skill of an experienced developer. Various programs or program modules can be created using any of the techniques known to one skilled in the art or can be designed in connection with existing software. For example, program sections or program modules can be designed in or by means of .Net Framework, .Net Compact Framework (and related languages, such as Visual Basic, C, etc.), Java, C++, Objective-C, HTML, HTML/AJAX combinations, XML, or HTML with included Java applets.

Moreover, while illustrative embodiments have been described herein, the scope of any and all embodiments having equivalent elements, modifications, omissions, combinations (e.g., of aspects across various embodiments), adaptations and/or alterations as would be appreciated by those skilled in the art based on the present disclosure. The limitations in the claims are to be interpreted broadly based on the language employed in the claims and not limited to examples described in the present specification or during the prosecution of the application. The examples are to be construed as non-exclusive. Furthermore, the steps of the disclosed methods may be modified in any manner, including by reordering steps and/or inserting or deleting steps. It is intended, therefore, that the specification and examples be considered as illustrative only, with a true scope and spirit being indicated by the following claims and their full scope of equivalents.

What is claimed is:

1. A computer-implemented system for managing a highly available distributed database in a cloud computing environment, the system comprising:
    a memory storing instructions; and
    one or more processors configured to execute the instructions to:
        determine that a source node, in a distributed database comprising the source node and one or more replica nodes, is not available;
        in response to the determination, select a most-updated replica node from the one or more replica nodes;
        switch a role of the most-updated replica node from replica to source;
        update a data store to label the source node as unavailable and the selected replica node as being a promoted source node;
        send a notification to a user device connected to the distributed database to update a database topology log based on the updated data store;
        receive data corresponding to the database topology log of the user device;
        determine whether the user device has updated the database topology log based on the received data; and
        upon determining the user device has not updated the database topology log, continue to send the notification to the user device until the user device has updated the database topology log.

2. The system of claim 1, wherein the processor is further configured to: determine that the source node is available; update a last seen time in the data store; wait for a specific time interval; and determine whether the source node is available.

3. The system of claim 1, wherein the processor is further configured to: determine that no promoted source may be selected;
    upon the determination, alert the user device.

4. The system of claim 1, wherein the data store is a distributed data store comprising a last seen time, database topology labels, and user device data and statistics.

5. The system of claim 1, wherein the processor is further configured to, upon determining the user device has updated the database topology log, terminate a previous connection with the user device.

6. The system of claim 1, wherein determining whether the user device has updated the database topology log comprises checking the data store for a confirmation from the user device.

7. The system of claim 1, wherein the processor is further configured to monitor the data store and the distributed database in a specific time interval to ensure the data store is up to date.

8. The system of claim 1, wherein the distributed database exists in a cloud computing environment.

9. The system of claim 1, wherein the notification comprises instructions to connect the user device to the promoted source node.

10. A computer-implemented method for managing a highly available distributed database in a cloud computing environment, the method comprising:
    determining that a source node, in a distributed database comprising the source node and one or more replica nodes, is not available;
    in response to the determination, selecting a most-updated replica node from the one or more replica nodes;

switching a role of the most-updated replica node from replica to source;

updating a data store to label the source node as unavailable and the selected replica node as being a promoted source node;

sending a notification to a user device connected to the distributed database to update a database topology log based on the updated data store;

receiving data corresponding to the database topology log of the user device;

determining whether the user device has updated the database topology log based on the received data; and upon determining the user device has not updated the database topology log, continuing to send the notification to the user device until the user device has updated the database topology log.

11. The method of claim 10, further comprising:
determining that the source node is available; updating a last seen time in the data store;
wait for a specific time interval; and determine whether the source node is available.

12. The method of claim 10, further comprising:
determining that no promoted source may be selected; upon the determination, alerting the user device.

13. The method of claim 10, wherein the data store is a distributed data store comprising a last seen time, database topology labels, and user device data and statistics.

14. The method of claim 10, further comprising, upon determining the user device has updated the database topology log, terminating the previous connection with the user device.

15. The method of claim 10, wherein determining whether the user device has updated the database topology log comprises checking the data store for a confirmation from the user device.

16. The method of claim 10, further comprising monitoring the data store and the distributed database in a specific time interval to ensure the data store is up to date.

17. The method of claim 10, wherein the distributed database exists in a cloud computing environment.

18. The method of claim 10, wherein the notification comprises instructions to connect the user device to the promoted source node.

19. A computer-implemented system for managing a highly available distributed database in a cloud computing environment, the system comprising:
a memory storing instructions; and
one or more processors configured to execute the instructions to:
determine that a source node, in a distributed database existing in a cloud computing environment comprising the source node and one or more replica nodes, is not available;
in response to the determination, select a most-updated replica node from the one or more replica nodes;
switch a role of the most-updated replica node from replica to source;
update a data store to label the source node as unavailable and the selected replica node as being a promoted source node;
send a notification to a user device connected to the distributed database to update a database topology log based on the updated data store;
receive data corresponding to the database topology log of the user device;
determine whether the user device has updated the database topology log based on the received data;
upon determining the user device has not updated the database topology log, continue to send the notification to the user device until the user device has updated the database topology log; and
upon determining the user device has updated the database topology, terminate the previous connection with the user device.

20. The system of claim 19, wherein the processor is further configured to: determine that the source node is available; update a last seen time in the data store; wait for a specific time interval; and determine whether the source node is available.

* * * * *